Nov. 10, 1953  G. F. SCHERER  2,658,713
AUTOMATIC LUBRICATION
Filed Aug. 27, 1948  2 Sheets-Sheet 1

INVENTOR
George F. Scherer
By Strauch & Hoffman
Attorneys

Nov. 10, 1953     G. F. SCHERER     2,658,713
AUTOMATIC LUBRICATION
Filed Aug. 27, 1948     2 Sheets-Sheet 2
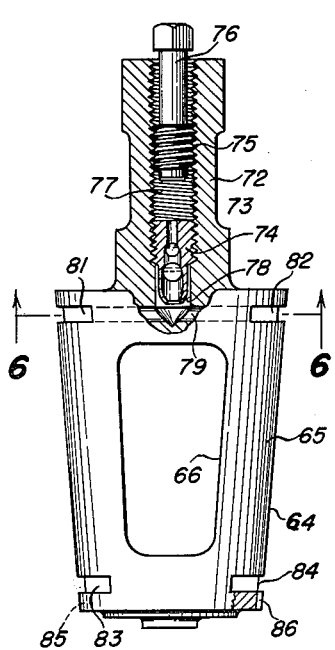
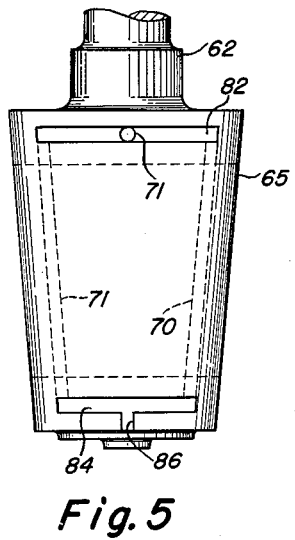
Fig. 5
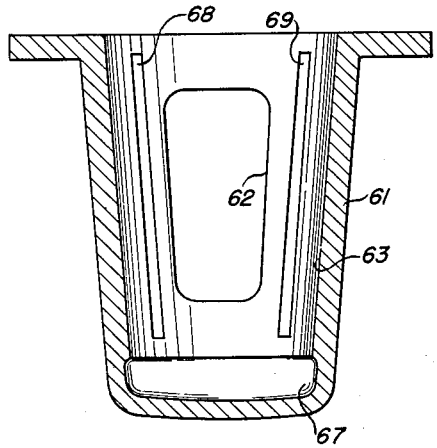
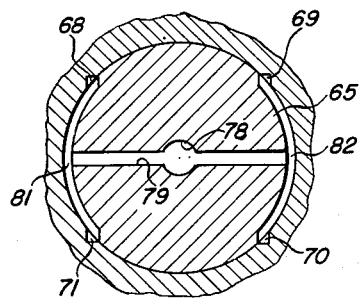
Fig. 4
Fig. 6
INVENTOR
George F. Scherer
By *Strauch & Hoffman*
Attorneys Patented Nov. 10, 1953

2,658,713

UNITED STATES PATENT OFFICE 2,658,713

AUTOMATIC LUBRICATION

George F. Scherer, Oakland, Calif., assignor to Rockwell Manufacturing Company, Pittsburgh, Pa., a corporation of Pennsylvania Application August 27, 1948, Serial No. 46,460

6 Claims. (Cl. 251—93)

This invention relates to lubricated plug valves and is particularly directed to the automatic lubrication of such valves.

Lubricated plug valves are in general use in industry today. In these valves, lubricant, usually an incompressible plastic of such viscosity as to be identified as a grease, is stored in a reservoir and this reservoir is connected by suitable ducts with surface grooves either on the valve plug or the valve body, or both, for conducting the lubricant to the seating surfaces between the valve plug and body to lessen the turning effort and provide an effective plastic seal between the valve plug and body for preventing leakage of the line fluid under line pressure. In some of these valves the lubricant is employed to exert a jacking action on the plug to unseat it when frozen or difficult to turn.

In all types of lubricated plug valves the lubricant or grease performs a number of functions. While commonly designated as a lubricant, this material should possess certain properties which in addition to providing lubrication of the valve for easy turning should also possess sufficient viscosity and adhesion to the metal surfaces to provide a plastic seal between the metal closure surfaces and, in addition, act as a protective film on such surfaces to minimize the chances of corrosion of these surfaces. Furthermore, this plastic sealing is important as a means of preventing leakage of line fluid without undue distortion of the metal structure such as generally occurs with other than lubricated valves. Obviously, the valve lubricant must be resistant to the line fluid to the extent that it is not rapidly removed by dissolving in the fluid or being otherwise rendered ineffective under the action of the line fluid and other conditions of the service such as elevated temperature.

However, since the valve lubricant must embody the characteristics of a plastic material in order to allow movement of the lubricant through the provided ducts and channels in the valve structure to permit the forming of a sealing film on the closure surfaces, it therefore follows that it must be kept under continuous pressure in order to replenish such of the lubricant as may be lost through dissolution in the line fluid, gradual displacement by line pressure, or loss from the lubricant channels in the seating surfaces should these be momentarily exposed while turning the valve from open to closed position or vice versa.

During the process of adding lubricant to the valve, either in the form of lubricant sticks subsequently put under pressure by the lubricant screw, or by injecting lubricant by means of a grease gun, or other contrivance, the lubricant throughout the lubricant reservoir and lubricant passageways is under pressure but since liquid or plastic materials from which the lubricants are commonly made are incompressible, the lubricant within the valve stops flowing as soon as the extraneous force used for moving the lubricant ceases. When an incompressible fluid trapped in a non-yielding container is put under pressure, it only requires the escape of an infinitesimally small fraction of the enclosed fluid to permit the pressure to drop from exceedingly high pressure to zero. This is essentially the condition which exists in a lubricated valve employing a conventional valve lubricant which is incompressible.

It follows, therefore, that under such conditions a lubricated valve employing an incompressible lubricant is only momentarily lubricated at full efficiency since some of the lubricant forming the lubricant barrier against leakage immediately begins to be displaced due to pressure of the line fluid, dissolving in the line fluid, or other causes. In addition to this, when the valve is operated a portion of the lubricant sealing film is scraped off the sealing surfaces and also a comparatively large volume of lubricant may be lost due to momentary exposure of certain of the lubricant channels if the valve design is of a type in which this occurs.

Even when additional lubricant is injected into the valve at rather frequent intervals to make up for such losses as described above, during the periods of time between these successive additions of lubricant the continuity of the lubricant sealing film may be broken to the extent that leakage of the line fluid occurs. If through neglect in replenishing such lubricant as may be lost during the normal operation of the valve or if comparatively long intervals of time pass between such renewals, not only excessive leakage may develop but the valve itself may be damaged because of access of the line fluid to working parts of the metal structure with subsequent corrosion or erosion of these parts and the valve rendered mechanically inoperative.

Because of these well-recognized factors, many attempts have been made to provide means for keeping such valves continuously and fully lubricated by various mechanical contrivances which will maintain the lubricant under continuous pressure or at least periodically move additional lubricant to replenish those portions which have been dissipated. Such devices generally are mechanisms either built into the valve as part of the valve structure or are designed to be added to the valve as an additional part of the valve mechanism. The additional cost of such devices has preventd their wider use and in many cases they could not be applied to valves already in service. Also the use of such self-feeding mechanisms or devices is not justified if the cost of such a device is out of proportion to the cost of the valve, which is frequently the case if it is desired to secure the benefits of automatic lubrication in valves of small size or low cost.

Furthermore, such automatic feeding mechanisms frequently interfere with the normal operation of the valve from the standpoint of undue size or weight and they frequently add an additional problem from the standpoint of corrosion by the valve fluid with the subsequent maintenance required to keep them in operating condition. A further consideration is the necessity for non-interference of such lubricating devices with the function of hydraulically jacking the valve plug from its seat in the event that it becomes stuck because of corrosion by the line fluid in such lubricated valves as incorporate this feature.

It is, therefore, a major purpose and object of my invention to provide a novel lubricated plug valve assembly and method of lubrication wherein a lubricant reservoir, whenever the lubricant sealing film on the surface closure surfaces is depleted of lubricant by the action of the line fluid, or when the valve is opened or closed as above explained, automatically displaces a portion of its lubricant to replenish the lubricant lost and to reestablish and maintain the plastic seal and insure adequate lubrication of the valve when it is again turned for opening or closing without the necessity for additional lubricant being aded to the lubricant reservoir by an attendant and without any alteration or addition to the valve structure.

It is therefore the further aim and object of my invention to provide a novel automatic lubrication system in a plug valve assembly and method of lubrication by which an ordinary lubricated plug valve may be provided with automatic lubrication without the addition of special equipment and/or modification of the existing valve structure and with no additional expense to the operator.

It is a further object of my invention to provide a novel lubricated plug valve assembly and method of lubrication wherein the assembly contains a complete lubricant distributing system comprising a reservoir containing a body of expansible lubricant maintained under pressure, connected with suitable ducts and grooves leading to the valve seating and sealing surfaces and wherein lubricant from the reservoir automatically expands to replenish lubricant depleted from the grooves and sealing film.

It is a further object of my invention to provide a novel method of lubrication in a plug valve assembly wherein energized lubricant in a reservoir automatically discharges itself to replenish lubricant washed out of the valve seating surface grooves by action of the line fluid during opening and closing movements of the valve or while standing over long periods of time.

A further object of my invention is to provide a novel lubricated plug valve assembly and method of lubrication wherein a body of elastic lubricant is maintained compressed within a reservoir whereby it may discharge a portion of its bulk into connecting lubricant conducting ducts and seating surface grooves of the valve for continuously replacing lubricant displaced from the grooves or sealing film.

A further object of my invention is to provide a novel lubricated plug valve assembly and method of lubrication wherein a body of lubricant is maintained in an energized state whereby it will continuously and automatically maintain sufficient pressure throughout the mass of lubricant to immediately close up and seal off any channels through the lubricant mass which may be occasioned by a momentary escape of line fluid through this mass.

In its preferred embodiment, the invention will be described as applied to lubricated plug valve assemblies of the type which contain a lubricant reservoir connected by ducts or other passages to grooves in the valve seating surfaces for supplying lubricant directly to the seating and sealing surfaces between the valve plug and body. The lubricant in the reservoir, according to the preferred embodiment of the invention, is maintained in an energized state whereby energy stored in the lubricant body itself will cause sufficient expansion of the lubricant through the ducts or passages into the grooves to replace that which has been lost, this being done automatically without special action by the attendant, and without any special mechanical means for displacing the lubricant.

For any given conditions affecting the flow of lubricant through confining channels, the rate of flow will be governed by the structural characteristics of the confining passage-ways. Therefore, the physical characteristics of the expansible lubricant, such as its viscosity, wetting power, and the like, must be such as to permit free movement under pressure through the channels provided in the valve structure, and yet not flow out into the pipe line between the seating surfaces of the plug and body to an appreciable degree. Thus, the main lubricant body may be retained in a compressed state under its own pressure for long periods of time, feeding itself into the provided surface grooves as needed to maintain these grooves under pressure and to replenish any loss of lubricant occurring therein from normal operation of the valve.

After long periods of time or frequent operation of the valve, the energy of the compressed lubricant will gradually exhaust itself by expansion and it becomes necessary to replenish the main body of lubricant with fresh additions of new lubricant. This is added in the usual manner by means of inserting additional sticks of lubricant and compressing these with the lubricant compressor screw or by means of a high pressure grease gun or the like. The lubricant which is already in the valve lubricant reservoir and ducts behind the ball check valve, which is a part of the valve structure, is held in compression while the fresh lubricant is being added, and is then further compressed to the desired pressure by compression of the fresh lubricant above the check valve which has just been added.

Thus, it is obvious that in order to maintain the energized lubricant in a highly compressed state, it must be confined in a structure which is essentially closed at both the discharge end and at the inlet end where fresh lubricant can be added. It is also obvious that the physical characteristics of the lubricant employed must be such that it can be retained under pressure in the type of structure just described.

The feeding of lubricant from the reservoir to the sealing surfaces, obviously, requires the application of energy to effect its displacement from one location to another. Instead of depending upon the application of extraneous forces furnished by means of mechanical contrivances, such as compressed springs or by line fluid pressure, I store energy in the lubricant, itself, by providing a compressible and expandible lubricant in which the required energy is stored when filling the lubricant reservoir by compression with the lubricant compressor screw or grease gun. This stored energy is then available for providing continuous and automatic replacement of the lubricant seal as it is removed from one cause or another.

Furthermore, in order to maintain the valve in a fully lubricated condition whereby the lubricant seal is continuously maintained at all times, not only while operating the valve but while standing inoperative, it is necessary to maintain the lubricant seal under sufficient pressure continuously in order to secure the highest efficiency. This is accomplished by making use of the energy stored in the lubricant continuously so that the lubricant seal is under sufficient pressure at all times.

In the lubrication of lubricated valves with the non-energized lubricants heretofore in use, full and complete sealing of the valve by lubricant is obtained only momentarily, since as soon as the pressure applied by the lubricant screw or other means is stopped, the lubricant being non-elastic, no further feeding of the lubricant takes place. Thereafter, since the lubricant is a plastic material, the sealing film is dissipated by the pressure of line fluid trying to escape, by dissolving in the line fluid, by being wiped off the seats as the valve is turned, or by ejection from the exposed lubricant grooves when the valve is operated. In valves which provide a means for jacking the plug from its seat by lubricant pressure, the extent to which my compressible lubricant may be compressed, and therefore the pressure which it may exert in expanding to maintain full lubricant sealing pressure and yet not raise the plug from its seat and permit rapid escape of lubricant into the pipe line, depends upon the degree to which the yielding means holding the plug on its seat resists the upward pressure exerted by the lubricant plus the maximum line pressure. Since such valves are provided with yielding means such as springs or elastic packing which exert a back-pressure upon the lubricant to return the plug to its seat after being lifted by the excess of lubricant pressure over line pressure required to raise the plug from its seat, this represents the degree to which the lubricant can be compressed to furnish its own energy for subsequent expansion. Different types of lubricated valves incorporate different degrees of such yielding means but all types provide some such margin of compressibility which varies with the size and pressure rating of the valve.

When the lubricant is compressed to a sufficiently high pressure, the valve plug may then be jacked from its seat, if stuck due to corrosion, in the same manner as when using ordinary non-compressible lubricant. At pressures below that necessary to jack the plug from its seat, this energy is simply stored in the lubricant. If no yielding means are incorporated in such valves, then such lubricant can be compressed to an indefinitely larger extent and thus store a proportionately larger amount of energy.

It is also to be understood that merely including large bubbles of compressible gas within the lubricant, or the lubricant reservoir, and storing energy in these large gas bubbles by compressing them to a sufficient extent to energize the lubricant, obviously, will not provide a satisfactory means for obtaining the desired result if bubbles of compressed gas are incorporated in the lubricant system of a size larger than the cross-section of the lubricant channels or passage-ways. When these gas pockets reach the sealing areas of the valve, they, in effect, provide means of escape of the line fluid since they form no sealing barrier. In my invention the entrained gas bubbles are of sufficiently small size and are uniformly dispersed throughout the lubricant mass so that they form no breaks across the lubricant grooves and at no point does there exist a deficiency of plastic sealing material to form an effective sealing barrier and prevent escape of the line fluid. In other words, the gas bubbles which form the discrete phase are uniformly dispersed throughout the continuous phase in units sufficiently small to prevent line fluid channeling through the lubricant mass.

When the valve plug is rotated in its seat, the compressed lubricant in the grooves incorporated in the seating surfaces of the valves is continually pressed against the opposite walls across which said grooves slide and thus effectively wipes a film of lubricant on said walls to provide an efficient sealing film of lubricant thereon. When a non-expansible lubricant is employed, and after a very small volume is removed, the lubricant in said grooves is not under pressure and there is nothing to bring the balance of this lubricant in contact with the said walls to wipe thereon a lubricant film for sealing purposes. It is therefore obvious that my compressible lubricant is extremely effective in providing a sealing film of lubricant by wiping a film on the sealing surfaces of lubricated valves which employ a lubricant grooving system in the seating surfaces of the valves which do not completely surround the valve ports in the manner of other lubricated valve types, and therefore depend upon the wiping action of the lubricant in the surface grooves in order to distribute a sealing film of lubricant on the valve seats.

It is also to be understood that when my expansible lubricant is employed in lubricated valves of the cylindrical plug type where an appreciably larger gap exists between the plug and its seat than in lubricated valves of the tapered conical plug type, the same effective storage of energy in the lubricant mass may be utilized by selecting an energizable lubricant of sufficiently high viscosity and other physical characteristics to permit its being confined under appreciable internal pressures between the somewhat greater clearances between the valve seating surfaces in this type of valve and the check valve closure on the inlet end of the lubricant system. Therefore, my energized expansible lubricant performs in the same manner in the cylindrical plug type of lubricated valves as in the tapered conical plug type of lubricated valves as described in the foregoing.

In practicing the preferred embodiment of the invention, I employ a lubricant of the usual range of viscosities employed for conventional lubricated plug valves since the most desirable lubricant viscosity is largely determined by the type of sealing film required to hold particular ranges of line pressure and temperature. I also employ the basic types of lubricant, as to composition, which are required to withstand disintegration by the line fluid, such as their insolubility therein, their temperature resistance, and their inertness in regard to chemical attack by the line fluid. In these lubricant bases, I incorporate a sufficient degree of compressibility and expansibility, by dispersing throughout the lubricant mass a sufficient amount of compressible gas such as air, carbon dioxide, nitrogen, or other fixed gases, to provide a means of storing energy in the lubricant mass by subsequent compression of the dispersed gas bubbles. I obtain this dispersion of the gas phase of my lubricant in small discrete particles uniformly distributed throughout the mass by whipping the gas into the lubricant base in a standard soap crutcher or by any other apparatus commonly used for this purpose. I may also choose to incorporate the desired amount of compressible gas in my lubricant by such means as employing reactive chemicals capable of generating discrete gas bubbles throughout the mass by heating, such as sodium peroxide, or the like, or I may choose to produce my expansible lubricant by incorporating materials which contain dissolved gas which may readily be evolved by means of heat, chemical reaction, or the like.

I have found that I cannot use bubbles of true vapors since these collapse to liquids when their temperature is lowered as at the operating temperature at which the lubricant is employed in the valve, and therefore do not serve as a means of storing pressure energy as well as a fixed gas like air, carbon dioxide, nitrogen, or the like. In general, whatever gases are employed to provide the means of storing energy within the lubricant by compressing them to a smaller volume in the valve, should be essentially unreactive with the lubricant matrix in which they are dispersed.

It is also to be understood that my energizable lubricant, as made available for use in stick or bulk form, contains the mass of dispersed discrete gas bubbles at a pressure corresponding to the ambient pressure at which it is stored or handled and that the energy which is available for automatically lubricating the valve is obtained and stored by compression of the lubricant within the valve or within pressure vessels which may be attached to the valve to transfer the compressed lubricant to the valve lubricating ducts without allowing the pressure to be dissipated except in furthering the movement of the lubricant for securing the results desired. It is to be further understood that my lubricant in the form of sticks or bulk, when examined superficially, looks very much like the ordinary non-energizable valve lubricants heretofore in use.

In the process of energizing this lubricant, it is pumped into the valve lubricant reservoir by means of a screw compressor or grease gun which puts successive increments of the lubricant under sufficient pressure to force them through a check valve, of one type or another, into the lubricant reservoir where it is trapped under pressure between the closure surfaces of the valve seat and the check valve. When the pumping pressure is subsequently relieved to permit refilling of the pump chamber with fresh lubricant, the compressed lubricant is retained in the lubricant reservoir between the valve seats and the check valve. The check valve may be located either within the lubricated valve, itself, or in a lubricant pressure vessel attached thereto, but should, preferably, be located as close to the end of the compressor piston as practicable so that a minimum volume of the compressed lubricant remains upstream from the check valve. This is desirable since this residual lubricant will reexpand to its original volume when the pump pressure is reduced while the pump compression chamber is being refilled with a fresh lubricant charge. Obviously, each increment of fresh lubricant has to be compressed to a pressure at least equal to that already existing in the lubricant already in the lubricant reservoir in order that the fresh increment may be injected into the lubricant reservoir. Instead of employing a check valve it is obvious that some other type of valve such as a needle valve, globe valve, or the like, could be employed to contain the compressed lubricant but this would have to be separately manipulated. Also, there is no objection to using more than one check valve if desired.

I have found that an energizable expansible lubricant, such as I have described, which may be used to secure automatic lubrication in a practicable manner, may be made with various degrees of compressibility ranging from a very small amount to as much as 75 percent, or more. For practical reasons, I prefer to use a lubricant possessing about 25 percent to 50 percent compressibility to meet general operating conditions of valve service.

I have also found that when employing an energizable lubricant of a normal viscosity, approximating that of ordinary non-energizable lubricants such as are now in common use, I have been able to retain the lubricant pressure in a typical standard lubricated valve under an initial lubricant pressure about 400 p. s. i. for periods of as long as 30 days, with practically no loss of its initial pressure; with the valve in normal adjustment and standing unoperated. Upon then operating the valve and testing with line pressure gas at 400 p. s. i., the valve held tight. On another standard lubricated valve built for high operating pressure with the lubricant compressed to an initial lubricant pressure of 1400 p. s. i., after thirty days standing without operation the lubricant pressure had dropped only a negligible amount and the valve when tested was tight against 1000 p. s. i. gas line pressure.

I have also found that under drastic service conditions in which a standard type lubricated valve was tested on a line with a line pressure of 1000 p. s. i. gas, and my expansible lubricant compressed to 1800 p. s. i., and the lubricant completely removed from the downstream exposed surface groove each time the valve was operated, I was able to maintain a completely tight shut-off for 25 or more operations while when a standard incompressible gas type lubricant was used in the same valve under the same conditions, the valve leaked after one operation.

I have also found that when employing my compressible lubricant in a valve, I am able to determine at all times whether or not the valve requires additional lubricant to be added to maintain the valve in full and efficiently lubricated condition by simply noting the pressure of the lubricant in the lubricant reservoir. This can be easily determined by attaching a pressure gage to the valve or attaching such a gage to the lubricant compressor so that it registers the pressure of the lubricant in the valve when adding fresh lubricant. The optimum range of pressure exerted by the compressed lubricant in the lubricant reservoir can be predetermined and additional lubricant added whenever the lubricant pressure falls below the minimum pressure decided upon for most efficient operation. Fresh lubricant is then added and compressed to the maximum pressure decided upon for satisfactory operation without adding an excessive amount sufficient to lift the plug from its seat, which would only be wasted as it would disperse itself out into the pipe line.

When ordinary non-compressible lubricant is slowly injected into the valve, there is no appreciable pressure registered until the volume injected just fills the lubricating system of the valve, at which point, further compression forces all additional lubricant out into the pipe line where it is wasted and the lubricant pressure falls to zero immediately, or as soon as a small volume of the lubricant then occupying the lubricant system is dissipated.

Thus, the use of my compressible lubricant not only keeps the valves in which it is used more efficiently lubricated over long periods of time and requires less frequent attention by the operators, but also saves the waste of lubricant caused by excessive lubrication or failure to maintain the valve fully lubricated when applying ordinary incompressible lubricants.

Other objects of the invention will become apparent from inspection of the appended claims and the annexed drawings wherein:

Figure 4 is an exploded view of a plug and valve body assembly of different valve construction, wherein the lubricant reservoir is in the plug stem;

Figure 5 is a side elevation, viewed 90° from Figure 4, illustrating the surface grooves in the valve plug of Figure 4; and Figure 6 is a section on line 6—6 of Figure 4, illustrating the lubricant ducts and grooves.

Figure 1:
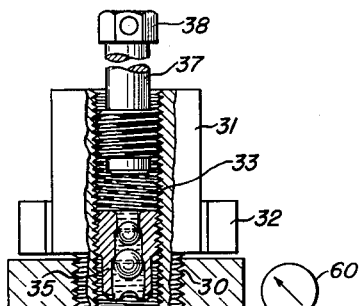
Figure 1 is an axial section through a lubricated plug valve assembly according to a preferred embodiment of my invention wherein the energized lubricant is maintained in a reservoir adjacent to smaller end of the plug.

Referring to Figure 1, a valve body 11 is provided with a longitudinal through passage 12 having a tapered valve seat portion comprising an upper conical valve seat surface 13 and a lower conical valve seat surface 14 providing annular radial and thrust bearing surfaces for a tapered valve plug 15 having a through port 16. The valve plug being shown in valve closed position in Figure 1.

The lower tapered plug seating surface 14 is closed at its lower end by a flexible steel diaphragm having its outer rim secured between the valve body and a heavy steel closure plate 18 fastened to body 11 as by bolts 19. The larger lower end of the plug 15 is formed with a conical depression 20 for seating a steel thrust ball 21. A thrust plate 22 is provided between diaphragm and ball 21, and an external thrust plate 23 is provided between diaphragm 17 and the adjacent end of a stud 24 threaded in plate 18 and having an external head 25 adapted to be engaged by wrench or the like. When stud 24 is rotated it exerts an axial pressure upward on the plug 15 thereby tending to seat the plug firmly on surfaces 13 and 14. Although tremendous mechanical pressure is exerted by the stud to maintain the plug seated in this manner, the plate 18 may be regarded as a resilient means opposing opposite axial movement of the plug with respect to its seating surfaces 13 and 14 when the hydraulic plug jacking action of the lubricant is applied.

At the upper end of plug 15 is an integral non-circular tongue 26 projecting into loose but non-rotatable engagement with an equalizer coupling member 27 having a non-circular aperture 28 adapted to receive the lowered correspondingly shaped end 29 of a rotatable operating stem 30 having an enlarged wrench fitting head 31. When a wrench is applied to head 31 and rotated, plug 15 may be rotated between 90° apart open and closed positions, limited by a stop collar 32, equalizer 27 serving as an axially loose coupling between stem 30 and plug 15.

Internally, stem 30 is provided with an axial threaded bore 33 which is in open communication at its lower end with the chamber 34 in the valve body surrounding equalizer coupling 27 at the small end of the plug 15. Bore 33 contains in threaded assembly two longitudinally successive double ball check valve assembly units 35 and 36 for preventing upward flow of lubricant from space 34 and a rotatable lubricant screw 37 which has an operating head 38 extending above stem 30.

The space within bore 33 extending from the lower end of screw 37 and the communicating space 34 below bore 33 combine to provide lubricant reservoir space, as will appear.

Figure 2:
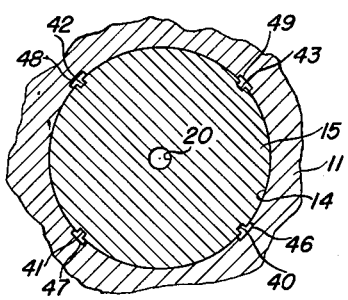
Figure 2 is a fragmentary section on line 2—2 of Figure 1, illustrating the valve seating grooves.

With reference to Figures 1 and 2, the surface of plug 15 is formed with four longitudinal surface grooves which are disposed 90° apart and parallel to the axis of rotation of the plugs. These grooves are indicated at 40, 41, 42 and 43. Diagonally opposite grooves 41 and 43 communicate at their upper ends with space 34, and all of the grooves 40—43 terminate at their lower ends at substantially the same level above and short of communication with an annular groove 44 which extends around the lower end of the plug as illustrated in Figure 1. The upper ends of diagonally opposite grooves 40 and 42 terminate short of communication with space 34 but extend within the area of seating surface 13.

Seating surface 14 of valve body 11 is formed opposite and coextensive with plug groove 44 with a similar continuous annular groove 45 and with four equally spaced short longitudinal grooves 46, 47, 48 and 49 that open at their lower ends into annular groove 45 and extend along surface 14 in 90° spaced relation to overlap with the lower ends of plug grooves 40—43, whereby when the plug is in the valve closed position of Figure 1 and when it is in the 90° rotated valve open position where port 16 is aligned with passage 12, plug grooves 40—43 are in communication with the annular groove arrangement at seating surface 14.

Upon removal of lubricant screw 37 from bore 33, lubricant in stick form may be dropped into the top of bore 33. Then the lubricant screw is inserted and rotated within bore 33 to place the lubricant in the reservoir under pressure so that lubricant is displaced downwardly through the check valve assemblies 35 and 36 into space 34 and thence downwardly through grooves 41 and 43 into the annular groove assembly 44 and 45 and upwardly through short grooves 46 and 48 into longitudinal plug surface grooves 40 and 42. Lubricant is thus supplied to fill the grooves at valve seating surfaces 13 and 14. When valve plug 15 is turned 90° from the position of Figure 1, for example being rotated counterclockwise in Figure 2, the above described lubricant distribution circuit will be substantially the same except that the longitudinal plug grooves will be displaced 90° so that groove 40 will now be in communication at its lower end with short groove 49 and the other plug grooves 41—43 correspondingly connected. Thus, in either of the 90° operative positions of the valve plug, the lubricant reservoir comprising the space within bore 33 and chamber 34 is connected through the above described groove system with the seating surfaces 13 and 14 of the valve body, the lubricant being displaced through the system until the reservoir space and the grooves are entirely filled with lubricant. When the plug is rotated to open or close the valve this lubricant in the grooves is smeared over the surfaces 13 and 14 to lubricate them and provide a plastic seal against escape of line fluid.

Further rotation of lubricant screw 37 will place the lubricant in the reservoir space above the small end of the plug valve under pressure. Prior to the present invention, where an incompressible valve lubricant was employed, this further rotation of the lubricant screw immediately built up pressure against the bottom end of the plug for exerting a hydraulic jacking action on the plug to axially displace the plug from its seating surfaces 13 and 14 against the resiliency of steel plate 18, for freeing the plug should it be frozen or difficult to rotate.

However, in the present invention, since the lubricant itself is compressible, rotation of lubricant screw 37 will institute compression of the aerated gas-filled lubricant mass within the reservoir space before any appreciable hydraulic jacking pressure is transmitted to the plug. The amount of compression of the lubricant which is possible before jacking is imminent depends of course upon the amount and compressibility of the gas which is incorporated into the body of lubricant, or more generally upon the compressibility of the lubricant mass. The very small clearances between the valve plug and body at surfaces 13 and 14 prevents the lubricant material from being displaced between the valve plug and body and thus permits the system to become pressurized.

I have found that in a system which employs my compressible lubricant mass, using a plastic lubricant of the incompressible type ordinarily available for plug valve lubrication and containing dispersed carbon dioxide gas, I am able to compress the lubricant mass within the reservoir to only a fraction of its original volume before sufficient pressure is transmitted to jack the plug off seats 13 and 14. The lubricant material transmitted through grooves in communication with space 34 completely fills the groove system in either of the 90° operative positions of the valve plug and thus provides lubricant material at the conical valve seating surfaces, and when the valve is rotated between opening and closing position this lubricant material from the surface grooves wipes across the valve seating surfaces thereby depositing thereon a thin film of lubricant material which provides an effective plastic seal preventing outward leakage of the line fluid from passage 12.

During rotation of the plug, two of the grooves are exposed to direct action of the line fluid. For example, assuming, fluid flow in the direction of the arrow in Figure 1, counterclockwise rotation of the valve to open position will move grooves 40 and 42 across passage 12 and groove 40 particularly is exposed to erosive action of the line fluid. It will also be noted that during this period that plug rotation groove 40 is entirely disconnected from the rest of the lubricant groove system, whereby even if the lubricant should be washed out of it groove 40 will not conduct the line fluid to the remainder of the groove system or to the lubricant reservoir space.

With the aerated lubricant in the reservoir space under compression according to the invention assume that during rotation of the valve plug from the closed position of Figure 1 to the 90° valve open position lubricant is washed out of grooves 40 and 42 by the action of the line fluid. Prior to the present invention, as explained above, it was necessary for the operator to, as soon as the valve reached fully open position, rotate the lubricant screw 37 a few turns in order to refill the lubricant system by forcing lubricant up through the associated short grooves into grooves 40 and 42 and replenishing the lost lubricant and insuring the adequate lubricant supply at the surfaces 13 and 14.

However, in the present invention, as soon as grooves 40 and 42 become once more connected with the associated grooves 47 and 49, the expansible lubricant mass in the reservoir space automatically displaces itself to move lubricant material through the groove system to refill grooves 40 and 42, the energy for thus displacing the lubricant material being available from the energy stored in the mass by compression as above described.

Thus, every time the valve plug is rotated between its opened and closed positions, the expansible lubricant mass in the reservoir automatically acts to refill and replenish any lubricant that might have become washed or otherwise depleted from any of the grooves in the system. This renders lubrication of the valve entirely independent of the operator.

Besides providing the automatic lubricant feeding feature for automatically replenishing of the lubricant supply in the grooves as above described, my invention provides a lubricant plug valve assembly wherein important valve working parts are protected by reason of this arrangement and the expansible action of the lubricant mass. For example, referring to Figure 1, if the emptied grooves 40 and 42 were not replenished with lubricant, after several turns of the plug the plastic seal at surfaces 13 and 14 would be lost whereby these surfaces would be exposed to corrosion or other action by the line fluid. My entire lubricant reservoir and distribution system including the grooves is always filled with lubricant material under pressure, and since the pressure of the lubricant material is normally greater than line fluid pressure there is no escaped line fluid in the pressurized space 34, for example, whereby equalizer 27 and all the parts above it in bore 33 including the relatively delicate ball checks at 35 and 36 are protected against any destructive action by the line fluid. Thus the automatic lubricant feeding action of my invention at the same time insures the automatic protection of the important valve parts against corrosion by line fluid, and the assembly is an efficient unit which will stand up in operation without any maintenance whatever for a considerable period of time.

Instead of putting the aerated lubricant under compression with the lubricant screw, I may attach a suitable fitting to the top of stem 30 and attach to it a grease gun or the like reservoir capable of exerting considerable pressure. When the lubricant pressure is higher than the line pressure of the fluid and of higher viscosity, when the two are in conflict the lubricant pressure prevails and displaces the line fluid whereby it automatically removes the latter from any part of the lubricant system.

The ratio of the volume of the total available expansion of the lubricant mass in the reservoir to the volumetric capacity of the grooves or other portions of the system that have to be automatically filled, and the frequency with which the valve is operated, primarily determine the amount of additional lubricant required to be periodically added to the reservoir. I have found that, using the ordinary plastic incompressible lubricant that is currently available for plug valves and incorporating in it a uniformally divided discrete dispersion of carbon dioxide gas or air or nitrogen as the compressible gas, I obtain a material which may be adequately energized when placed under compression by the rotation of the lubricant screw. As a practical matter I have found it satisfactory to provide in an ordinary plug valve assembly sufficient expansible lubricant to have a displaceable volume equal to about ten times the volume of the groove system. Under such conditions, with a valve assembly containing the compressed lubricant mass, I may rotate the plug valve from ten to one hundred or more times before it becomes necessary to consider relubricating the valve. The necessity for relubrication will arise when the lubricant pressure in the groove system becomes equal to the downstream pressure of the line fluid, which together with the expansibility of the lubricant mass determines the limit of automatic lubrication.

The automatic lubrication feature of the invention is independent of the line pressure of the fluid being handled, independent of the speed of turning of the valve plug and entirely independent of any external condition except the energized state of lubricant within the reservoir space.

Figure 3:
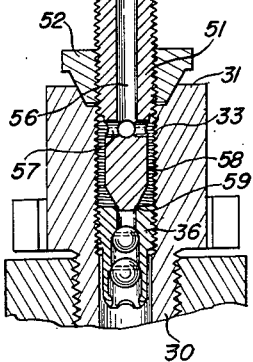
Figure 3 is a fragmentary elevation in section of an embodiment having increased lubricant capacities.

Figure 3 illustrates a further embodiment of the invention wherein lubricant screw 37 of Figure 1 is replaced by an external lubricator assembly 50 capable of storing an added amount of lubricant. External lubricator 50 comprises a lower threaded portion 51 threaded within stem bore 33 and locked by an adapter nut 52 to the upper end of stem 30 and contains a chamber 53 internally threaded to receive a closure screw 54 having a wrench receiving head 55. The lower end of chamber 53 communicates through a reduced bore 56 with a plurality of radial passages 57 to a spare indicated at 58 within bore 33. The lower end of stem 51 has a conical seat 59 adapted to seat upon the similarly formed upper end of check valve assembly 36 whereby when the lubricator assembly 50 is tightly seated at 59 and held there by nut 52 there is no lubricant flow in bore 33. When it is desired to add lubricant to the groove system, nut 52 is loosed, lubricator assembly 50 retracted to clear seat 59 and screw 54 rotated to displace lubricant through bore 56, passages 57, space 58 and check valve 36 into the groove system. Chamber 53 may contain a large store of compressed lubricant by locating check valve 36 at the upper end of chamber 53, eliminating screw 54 and using a grease gun to pressurize the system.

Figures 4–6 illustrate a further embodiment of the invention wherein the lubricant reservoir is located entirely in a stem integral with the plug. A valve body 61 having a through passage 62 is provided with a conical seating surface or bore 63 for receiving the conical surface 64 of a valve plug 65 which in turn is formed with a through port 66 adapted to register with passage 62 in the open position of the valve and to be disposed at 90° with relation to passage 62 in the closed position of the valve.

Valve body 61 is formed below seating surface 63 with a space 67 which is adapted to receive lubricant for jacking the valve plug from seat 63 as will appear. Valve body 61 is internally formed with four equally spaced longitudinal surface grooves 68, 69, 70 and 71 that extend substantially the length of the seating surface 63. Valve plug 65 is provided with an integral stem 72 having a threaded bore 73 for receiving a check valve assembly 74 and the threaded shank 75 of a lubricant screw 76. The space 77 between the bottom of the screw 76, when screwed in as far as possible, and the check valve may be regarded as temporary reservoir space in this valve since the lubricant in this space reexpands when the screw is removed for fresh additions of lubricant. The lower end 78 of bore 73 is, Figure 6, intersected by diametral duct 79 that opens at opposite ends into shallow grooves 81 and 82 on the plug surface, which grooves extend for about 90° of the circumferentially extent of the plug and are equally spaced at their ends by 90° non-recessed portions of the plug. Passage 66 is displaced 90° from the grooves 81 and 82 as illustrated.

The lower end of plug 75 is formed with similar surface grooves 83 and 84 each 90° in extent, and each of grooves 83 and 84 has in communication therewith short longitudinal plug surface grooves 85 and 86 respectively which extend from grooves 83 and 84 to the lower end of the plug and space 67.

When plug 65 is inserted into valve body 61, as in Figure 4, the valve is in open position since port 66 is aligned with passage 62, and the sectoral surface grooves on the plug are connected at their opposite ends with longitudinal grooves on the valve body. This is a condition illustrated in Figure 6.

When the valve is rotated 90° to fully closed position, as in the position diagrammatically illustrated by Figure 5, the grooves 81, 82, 83 and 84 of the plug will be again connected at their opposite ends to the upper and lower ends of the longitudinal grooves in the valve body, thereby providing a complete and continuous sealing region about the passage opening 62. In either of the 90° positions of rotation of the valve plug, lubricant may be displaced from the space below the check valve and duct 79, plug grooves 81 and 82, body grooves 68—71 and plug grooves 83 and 84. Grooves 83 and 84 also communicate through longitudinal plug grooves 85 and 86 to the jacking space 67 at the bottom of the valve plug. Should lubricant become washed or otherwise displaced out of any of the grooves during rotation of the valve plug between open and closed positions, the expansible body of lubricant in the reservoir space and groove system will automatically displace part of its mass to replenish the voids in the system and refill the grooves and thereby insure proper lubrication of the plug and efficient plastic sealing of the port at all times.

A suitable pressure gauge or indicator may be attached to the valve assembly for indicating the pressure of the compressed body of lubricant as heretofore suggested. Such a gauge 60 in Figure 1 is connected by a passage 60' with the space 34 containing energized lubricant and it is readily available to reading by an inspector. If desired such a gauge may be utilized in any embodiment of the invention, or the gauge might be attached to discharge end of the lubricant gun that compresses the lubricant instead of to the valve.

Besides the lubricated plug valves illustrated and above mentioned, I have found that when energized lubricant is stored in the reservoir of such lubricant plug valves as illustrated in United States Letters Patent No. 1,608,519 to Nordstrom, wherein only two grooves are provided in the plug surface, excellent continuous sealing results are obtained, with absolutely tight shut-off being preserved against high line fluid pressures during many operations of the valve.

I have also found that, in the above discussed lubricated plug valves, certain unobvious advantages appear in operation. Particularly I have noted that the energized lubricant refills the downstream groove or grooves in the plug surface after the valve plug is turned to closed or shut-off position even when the pressure of the lubricant has dropped far below the upstream line pressure. For example, with upstream pressures of as high as 1000 pounds p. s. i. I have found that the energized lubricant body will expand to continuously refill an emptied downstream groove even when the lubricant pressure drops to as low as 150 pounds p. s. i. This is a safety feature should the lubricant replenishment service fail.

The energized or pressurized lubricant body is retained under pressure by unidirectional valves that permit entry of the lubricant but are urged closed by pressure from within the valve. In the described embodiments the illustrated check valves are those which are ordinarily provided in such valves for the purpose of preventing outbursts of line fluid when introducing lubricant. These check valves perform the added function of maintaining pressurization of the expansible lubricant body in the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An automatically sealed plug valve assembly comprising relatively rotatable body and plug members having cooperating fluid passages and ports, and sealing surfaces surrounding said ports spaced by a layer of plastic sealant; a plastic sealant reservoir; plastic sealant distributing channels between said reservoir and said plastic sealant layer extending at least partly around said ports in open and closed positions of the valve, said distributing channels being cut off from said reservoir intermediate open and closed positions of the valve; an energized expansible body of plastic sealant in said reservoir and said distributing channels including a uniform stable dispersion of small compressed discrete gas bubbles exerting sufficient pressure on the surrounding plastic to automatically force it into voids formed by operating losses in said plastic layer, whereby said layer of plastic sealant is continuously maintained between said sealing surfaces; and means for introducing plastic sealant into said reservoir and for maintaining pressure on the body of sealant plastic in the reservoir for keeping it energized and preventing its expansion except through said distributing channels, the energized plastic sealant in said channels being expansible through its own energy to replace operating losses in said plastic layer even when said channels are cut off from said reservoir.

2. An automatically sealed plug valve assembly comprising relatively rotatable body and plug members having cooperating fluid passages and ports, and sealing surfaces surrounding said ports spaced by a layer of plastic sealant; a plastic sealant reservoir; plastic sealant distributing channels between said reservoir and said plastic sealant layer extending at least partly around said ports in open and closed positions of the valve, said distributing channels comprising at least one sealing surface groove extending longitudinally of said members which is not exposed to line fluid in all positions of relative rotation of the valve members; an energized expansible body of plastic sealant in said reservoir and said distributing channels including a uniform stable dispersion of small compressed discrete gas bubbles exerting sufficient pressure on the surrounding plastic to automatically force it into voids formed by operating losses in said plastic layer, whereby said layer of plastic sealant is continuously maintained between said sealing surfaces; and means for introducing plastic sealant into said reservoir and for maintaining pressure on the body of sealant plastic in the reservoir for keeping it energized and preventing its expansion except through said distributing channels, the energized plastic sealant in said channels being constantly expansible through its own energy to replace operating losses in said plastic layer.

3. An automatically sealed plug valve assembly comprising relatively rotatable body and plug members having cooperating fluid passages and ports, and sealing surfaces surrounding said ports spaced by a layer of plastic sealant; a plastic sealant reservoir; plastic sealant distributing channels between said reservoir and said plastic sealant layer extending at least partly around said ports in open and closed positions of the valve, said distributing channels comprising at least one continuous circumferential sealing surface groove and at least one longitudinal sealing surface groove, said grooves being connected in at least the open and closed positions of the valve and disposed so as not to be exposed to line fluid in any position of relative rotation of said members; an energized expansible body of plastic sealant in said reservoir and said distributing channels including a uniform stable dispersion of small compressed discrete gas bubbles exerting sufficient pressure on the surrounding plastic to automatically force it into voids formed by operating losses in said plastic layer, whereby said layer of plastic sealant is continuously maintained between said sealing surfaces; and means for introducing plastic sealant into said reservoir and for maintaining pressure on the body of sealant plastic in the reservoir for keeping it energized and preventing its expansion except through said distributing channels, the energized plastic sealant in said channels being constantly expansible through its own energy to replace operating losses in said plastic layer.

4. In the plug valve assembly defined in claim 3, said grooves being connected in only the open and closed positions of the valve and cut off from each other in other positions of the valve.

5. In the plug valve assembly defined in claim 3, said grooves being always in communication with each other.

6. An automatically sealed plug valve assembly comprising relatively rotatable body and plug members having cooperating fluid passages and ports, and sealing surfaces surrounding said ports spaced by a layer of plastic sealant; a plastic sealant reservoir; means disposed between said reservoir and said plastic sealant layer for distributing said sealant into said layer comprising at least two distributing grooves extending longitudinally of said surfaces, one between each port side, said grooves being disposed so as not to be exposed to line fluid in any position of relative rotation of said members; an energized expansible body of plastic sealant in said reservoir and said means including a uniform stable dispersion of small compressed discrete gas bubbles exerting sufficient pressure on the surrounding plastic to automatically force it into voids formed by operating losses in said plastic layer, whereby said layer of plastic sealant is continuously maintained between said sealing surfaces; and means for introducing plastic sealant into said reservoir and for maintaining pressure on the body of sealant plastic in the reservoir for keeping it energized and preventing its expansion except through said means, the energized plastic sealant in said means being expansible through its own energy to replace operating losses in said plastic layer.

GEORGE F. SCHERER.

References Cited in the file of this patent

UNITED STATES PATENTS

| Number | Name | Date |
| --- | --- | --- |
| 1,696,774 | Martin | Dec. 25, 1928 |
| 1,762,902 | Werder | June 10, 1930 |
| 1,780,160 | Leach | Nov. 4, 1930 |
| 1,932,322 | Nordstrom | Oct. 13, 1930 |
| 1,944,995 | Nordstrom | Jan. 30, 1934 |
| 2,048,884 | Nordstrom | July 28, 1936 |
| 2,114,934 | Nordstrom | Apr. 19, 1938 |
| 2,122,560 | De Florez | July 5, 1938 |
| 2,466,790 | Bettcher | Apr. 12, 1949 |